United States Patent [19]
Kim

[11] Patent Number: 5,392,101
[45] Date of Patent: Feb. 21, 1995

[54] SHADING COMPENSATION DEVICE FOR AN IMAGE FORMING APPARATUS

[75] Inventor: Jong-heui Kim, Suwon, Rep. of Korea

[73] Assignee: Samsung Electronics Co., Ltd., Kyungki, Rep. of Korea

[21] Appl. No.: 162,611

[22] Filed: Dec. 7, 1993

[30] Foreign Application Priority Data

Apr. 28, 1993 [KR] Rep. of Korea .............. 93-6877

[51] Int. Cl.6 .......................................... G03G 15/04
[52] U.S. Cl. .................................. 355/243; 347/256; 347/224; 355/233; 355/311
[58] Field of Search .............. 355/243, 233, 45, 44, 355/55, 56, 51, 57, 60, 235, 311, 218, 228; 346/108

[56] References Cited

U.S. PATENT DOCUMENTS 4,040,733  8/1977  Satomi ............................. 355/243
4,211,482  7/1980  Arai et al. ........................ 355/235
4,571,062  2/1986  Yoshioka et al. ............... 355/243
4,814,821  3/1989  Sawayama et al. ............. 355/260
4,901,113  2/1990  Sawayama et al. ............. 355/243
4,972,235 11/1990  Iwamoto et al. ................ 355/311
5,047,800  9/1991  Fukumoto et al. ............... 355/45
5,065,189 11/1991  Mizude ............................ 355/243
5,220,378  6/1993  Kirkpatrick et al. .............. 355/60
5,221,974  6/1993  Kusumoto et al. .............. 358/471
5,274,398 12/1993  Ban ................................. 346/108

Primary Examiner—A. T. Grimley
Assistant Examiner—Thu A. Dang
Attorney, Agent, or Firm—Leydig, Voit & Mayer

[57] ABSTRACT

An image forming apparatus has auxiliary reflecting mirrors placed around the lateral peripheries of a fixed reflecting mirror and a controller for moving the auxiliary reflecting mirrors so as to control the distance therebetween according to the size of a sheet of paper, thereby reducing the difference of light intensity between the center of the image and on the flanks thereof.

3 Claims, 4 Drawing Sheets

SHADING COMPENSATION DEVICE FOR AN IMAGE FORMING APPARATUS

BACKGROUND OF THE INVENTION

The present invention relates to an image forming apparatus, and more particularly, to an image forming apparatus having an auxiliary reflecting mirror placed around the flanks of a sheet of paper bearing an image, so as to effectively prevent a phenomenon in which the data corresponding to the flanks of the image are not precisely input.

Generally, in an image forming apparatus such as a color image scanner, color printer, digital color copier or the like, the light emitted from a light source such as a lamp is reflected from an image on a sheet of paper and the image is, in turn, formed on a photoelectric converting device by lenses. As the photoelectric converting device, for instance, a charge-coupled device (CCD) string is widely used. Each CCD outputs a signal corresponding to image information formed thereon. In accordance with image output devices, the signal is converted into digital form for transmission to an output device such as a printer or is processed as binary code for facsimile telegraphy.

In a conventional image forming apparatus, referring to FIG. 1, a fixed reflecting mirror 2 for reflecting light onto a sheet (not shown) bearing an image is located under lamp 1 along the whole length of lamp 1 so that the light is converged on the sheet. As shown in FIG. 5, however, the voltage output according to the light amount detected by a CCD sensor is lower around the center of the image-bearing sheet than on the flanks thereof. Due to the difference of light intensity between the center and the flanks, when an image is output, the image on the flanks of the sheet of paper becomes less clear than that on the center thereof.

SUMMARY OF THE INVENTION

The present invention is intended to obviate such a problem. It is an object of the present invention to provide an improved image forming apparatus which reduces the difference of light intensity at the center of a sheet of paper bearing an image and that on the flanks thereof, so as to input the image with more precision.

To accomplish the object of the present invention, there is provided an image forming apparatus having a lamp and a fixed reflecting mirror for reflecting light emitted from the lamp onto a sheet of paper, further comprising: auxiliary reflecting mirrors placed around the lateral peripheries of the fixed reflecting mirror for further reflecting the light of the lamp onto the sheet; and a controller for moving the auxiliary reflecting mirrors so as to control the distance therebetween according to the size of the sheet.

In the feature of the present invention, the auxiliary reflecting mirrors move so as to be located around the flanks of the sheet by the controller, according to the size of the sheet, so that the light from the lamp is converged such that the light intensity on the flanks of the sheet and that on the center thereof are nearly equal. The controller is controlled by a sheet-size selection signal.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE INVENTION

Figure 1:
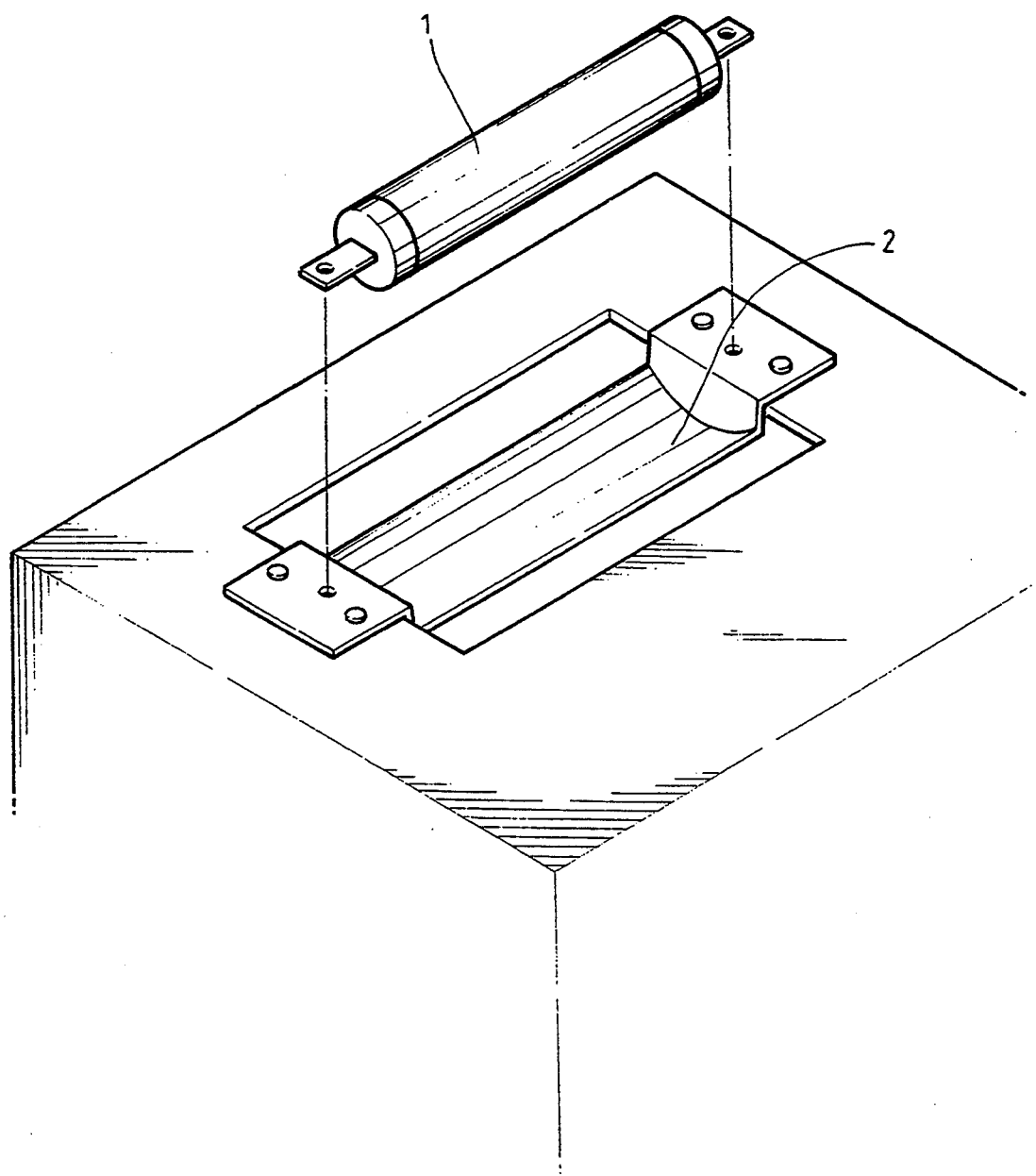
FIG. 1 is an extracted perspective view of the important components of a conventional image forming apparatus.
Figure 2:
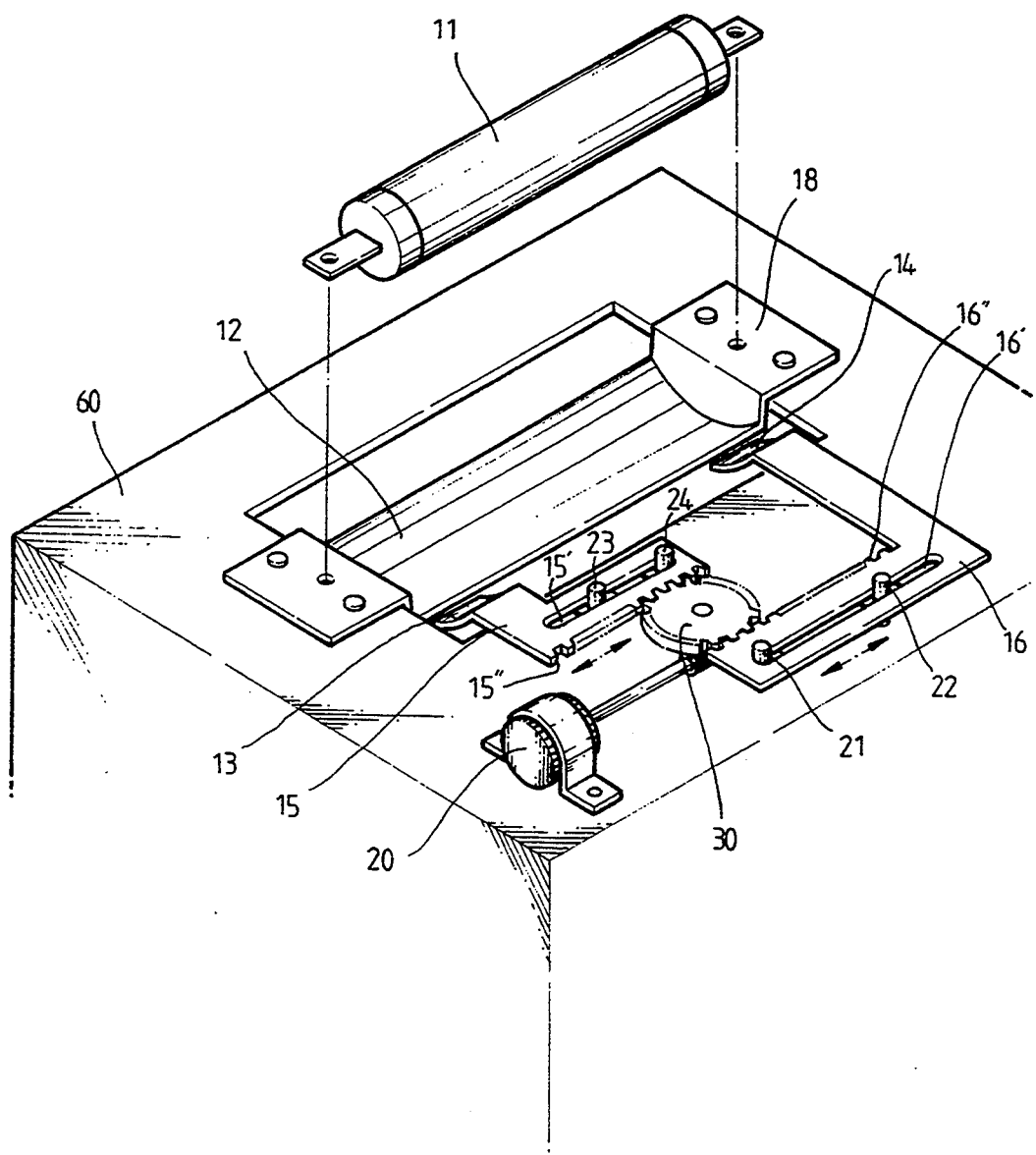
FIG. 2 is a schematic perspective view of an image forming apparatus of the present invention.
Figure 4:
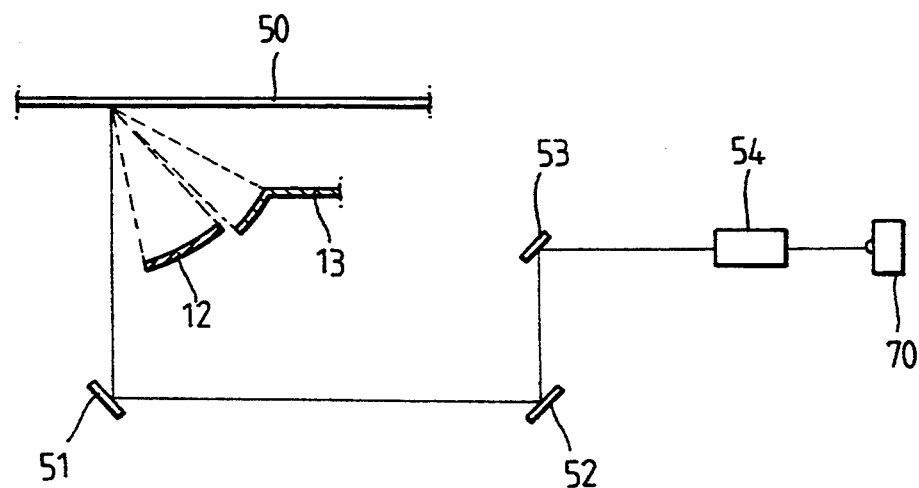
FIG. 4 is a schematic view of the image forming apparatus of the present invention.

Referring to FIGS. 2 and 4, a lamp 11, which is a light source, is installed so as to be held by a support 18 in a frame 60. A fixed reflecting mirror 12 for reflecting the light of lamp 11 onto a sheet of paper 50 is located on support 18 under lamp 11. The sheet 50 is provided above lamp 11. Auxiliary reflecting mirrors 13 and 14, which are able to move in the lengthwise direction of lamp 11, are placed near the ends of lamp 11. Auxiliary reflecting mirrors 13 and 14 are movably installed by a controller.

Figure 3:
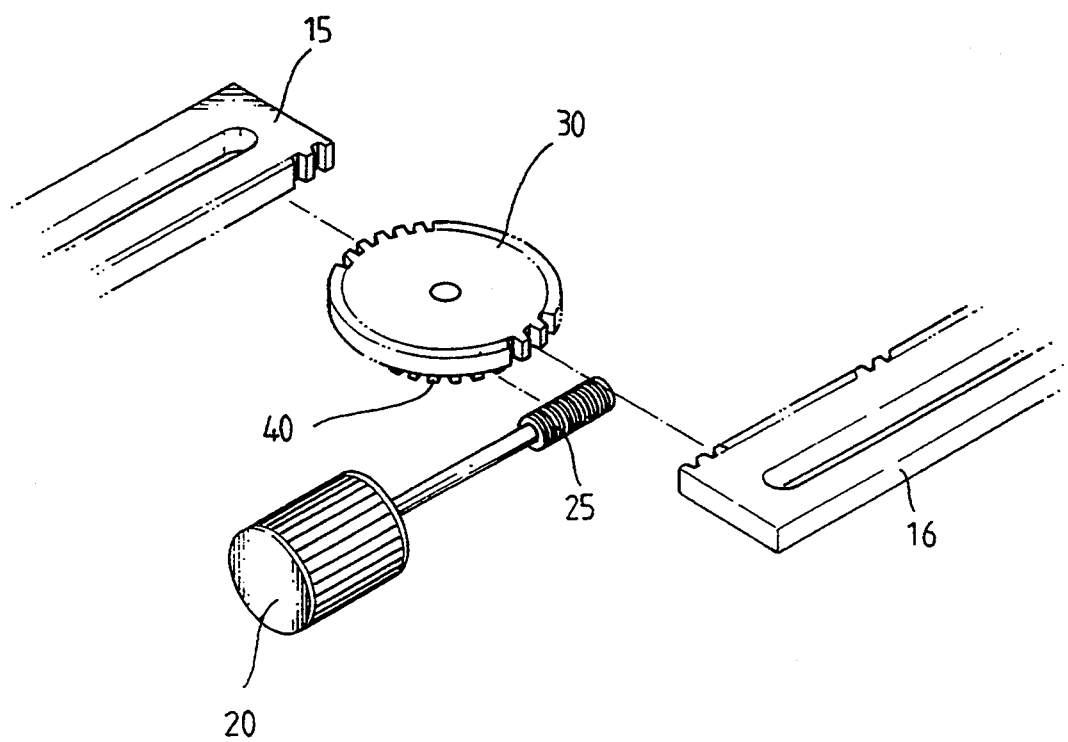
FIG. 3 is an extracted perspective view of the important components of the image forming apparatus shown in FIG. 2.

Referring to FIGS. 2 and 3, the controller is constructed so that a motor 20 is installed in frame 60, a gear assembly in which a driving gear 30 and worm gear 40 are concentrically provided is installed on frame 60, a worm 25 is installed on the shaft of motor 20 to engage with worm gear 40, and sliders 15 and 16 supporting respective auxiliary reflecting mirrors 13 and 14 and having racks 15" and 16" are interlocked with driving gear 30. Guide slots 15' and 16' are formed in sliders 15 and 16. Guide pins 23 & 24 and 21 & 22 connected with guide slots 15' and 16' for guiding sliders 15 and 16 are provided in frame 60. Motor 20 is driven by a signal representing the selected sheet size.

Referring to FIG. 4 again, a plurality of reflecting mirrors 51, 52 and 53 and a lens 54 for converging the light reflected from sheet 50 onto CCD 70 are provided in frame 60.

Now, the operation of the image forming apparatus of the present invention will be described below.

When sheet 50 is inserted into the apparatus, motor 20 is driven by a sheet-size selection signal, so that driving gear 30 and worm gear 40 which is interlocked with worm 25 placed on the shaft of motor 20 are rotated in tandem. Here, sliders 15 and 16 engaging with driving gear 30 slide according to the sheet-size selection signal in the opposite direction from each other, and auxiliary reflecting mirrors 13 and 14 installed in sliders 15 and 16 are in turn located around the flanks of the sheet.

Figure 5:
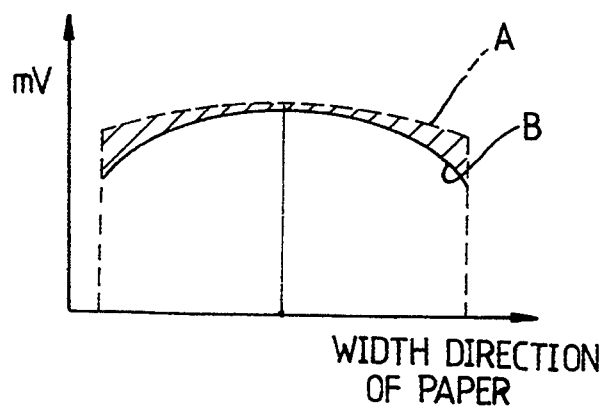
FIG. 5 is a graph showing the difference of light intensity between the light at the center of a sheet and that on the flanks thereof in the prior art and the present invention.

FIG. 5 illustrates the result in which light intensity detected by CCD 70 is converted into the form of an electrical signal in the state in which auxiliary reflecting mirrors 13 and 14 are placed on the flanks of the selected sheet 50, and the image thereon is input. In FIG. 5, it should be noted that, comparing line A in accordance with the apparatus of the present invention and line B of the conventional one, the difference of the electrical signal between the center of the sheet and on the flanks thereof is reduced in line A. In other words, light is complementarily converged on the flanks of sheet 50 so as to minimize the difference of light intensity between the center of the sheet of paper bearing an image and the flanks thereof. This allows the precise outputting of information.

As described above, by installing auxiliary reflecting mirrors 13 and 14 around the flanks of a sheet of paper, the image forming apparatus of the present invention reduces the difference of light intensity between the center of the sheet and on the flanks thereof, to provide for clearly input information throughout the image on the sheet. Further, since motor 20 is driven in accordance with a sheet-size selection signal to move auxiliary reflecting mirrors 13 and 14 to the flanks of a selected sheet bearing an image, the use of sheets of different sizes does not matter.

Accordingly, the image forming apparatus of the present invention is effective in outputting an exact image, regardless of sheet size, by greatly reducing the difference of light intensity between the center of the sheet and that on the flanks thereof.

What is claimed is:

1. A shading compensation device for an image forming apparatus, comprising:
   a lamp;
   a fixed reflecting mirror positioned to reflect light from said lamp onto a sheet of paper bearing an image;
   first and second auxiliary reflecting mirrors placed adjacent to a lateral periphery of said fixed reflecting mirror for further reflecting light of said lamp to the sheet; and
   controlling means for reciprocally moving said first and second auxiliary reflecting mirrors so as to control a distance between said first and second auxiliary reflecting mirrors according to a size of the sheet.

2. An image forming apparatus as claimed in claim 1, wherein said controlling means is includes a motor for producing power, a driving gear driven by said motor, and a slider which supports said auxiliary reflecting mirrors and has a rack interlocked with said driving gear.

3. A shading compensation device for an image forming apparatus, comprising:
   a frame;
   a support attached to said frame;
   a lamp attached to said support, said lamp having first and second ends;
   a fixed reflecting mirror disposed on said support and positioned underneath said lamp to reflect light from said lamp onto a sheet;
   first and second auxiliary reflecting mirrors placed adjacent to the first and second ends of said lamp, respectively, for further reflecting light of said lamp onto the sheet; and
   a controlling device which reciprocally moves said first and second auxiliary reflecting mirrors to position said first and second auxiliary reflecting mirrors adjacent to respective flanks of the sheet.

* * * * *